United States Patent
Matsuzaka et al.

(10) Patent No.: US 7,630,021 B2
(45) Date of Patent: Dec. 8, 2009

(54) IMAGE PROCESSING DEVICE AND IMAGE PROCESSING METHOD

(75) Inventors: Kenji Matsuzaka, Nagano-ken (JP); Junichiro Shinozaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 566 days.

(21) Appl. No.: 11/084,857

(22) Filed: Mar. 17, 2005

(65) Prior Publication Data
US 2008/0019610 A1   Jan. 24, 2008

(30) Foreign Application Priority Data
Mar. 17, 2004   (JP) .............................. 2004-075671

(51) Int. Cl.
H04N 5/14   (2006.01)
(52) U.S. Cl. .......................... 348/700; 386/46; 386/52; 386/69; 386/117
(58) Field of Classification Search .................. 386/46, 386/52, 69, 117; 348/208.11, 208.12, 208.16, 348/221.1, 231.6, 362, 363, 390.1, 700, 701
See application file for complete search history.

(56) References Cited

U.S. PATENT DOCUMENTS

| | | | | |
|---|---|---|---|---|
| 4,897,716 | A | * | 1/1990 | Drewery et al. ............. 348/452 |
| 6,577,805 | B1 | | 6/2003 | Hirai |
| 6,704,029 | B1 | * | 3/2004 | Ikeda et al. ................. 715/723 |
| 6,798,447 | B1 | * | 9/2004 | Katsuki ................. 348/208.12 |
| 2004/0061791 | A1 | | 4/2004 | Terada |
| 2004/0223052 | A1 | * | 11/2004 | Sugano et al. ................. 348/70 |

FOREIGN PATENT DOCUMENTS

| | | |
|---|---|---|
| JP | 10-232884 | 9/1998 |
| JP | 11-215458 | 8/1999 |
| JP | 2000-268540 | 9/2000 |
| JP | 2002-084505 | 3/2002 |

(Continued)

OTHER PUBLICATIONS

Abstract of Japanese Patent Publication No. 10-232884, Pub. Date: Sep. 2, 1998, Patent Abstracts of Japan.

(Continued)

*Primary Examiner*—Huy T Nguyen
*Assistant Examiner*—Mishawn Dunn
(74) *Attorney, Agent, or Firm*—Martine Penilla & Gencarella, LLP

(57) ABSTRACT

An image processing device that joins together multiple scenes extracted from a video image, wherein scene information that indicates characteristics of the multiple scenes is extracted from multiple frame images that comprise the video image, where, when two scenes are to be joined together multiple types of transition effects to be used in the changing of the scenes is stored in advance, and a specific transition effect is selected, based on the extracted scene information, from the transition effects that have been stored in advance. For example, effects such as a slide or a wipe are selected based on the characteristics of the video image, such as the direction of movement of an object. The specific transition effect that has been selected is used to join together the two scenes. The result is that it is possible to set up effective scene changes to enable each scene to be joined together.

1 Claim, 14 Drawing Sheets

FOREIGN PATENT DOCUMENTS

| | | |
|---|---|---|
| JP | 2003-169298 | 6/2003 |
| JP | 2004-120544 | 4/2004 |

OTHER PUBLICATIONS

Abstract of Japanese Patent Publication No. 2002-084505, Pub. Date: Mar. 22, 2002, Patent Abstracts of Japan.
Abstract of Japanese Patent Publication No. 2003-169298, Pub. Date: Jun. 13, 2003, Patent Abstracts of Japan.
Abstract of Japanese Patent Publication No. 11-215458, Pub. Date: Aug. 6, 1999, Patent Abstracts of Japan.
Abstract of Japanese Patent Publication No. 2000-268540, Pub. Date: Sep. 29, 2000, Patent Abstracts of Japan.
Abstract of Japanese Patent Publication No. 2004-120544, Pub. Date: Apr. 15, 2004, Patent Abstracts of Japan.

* cited by examiner

Fig.9a
Slide
Scene n: slide-out
Scene n+1: slide-in
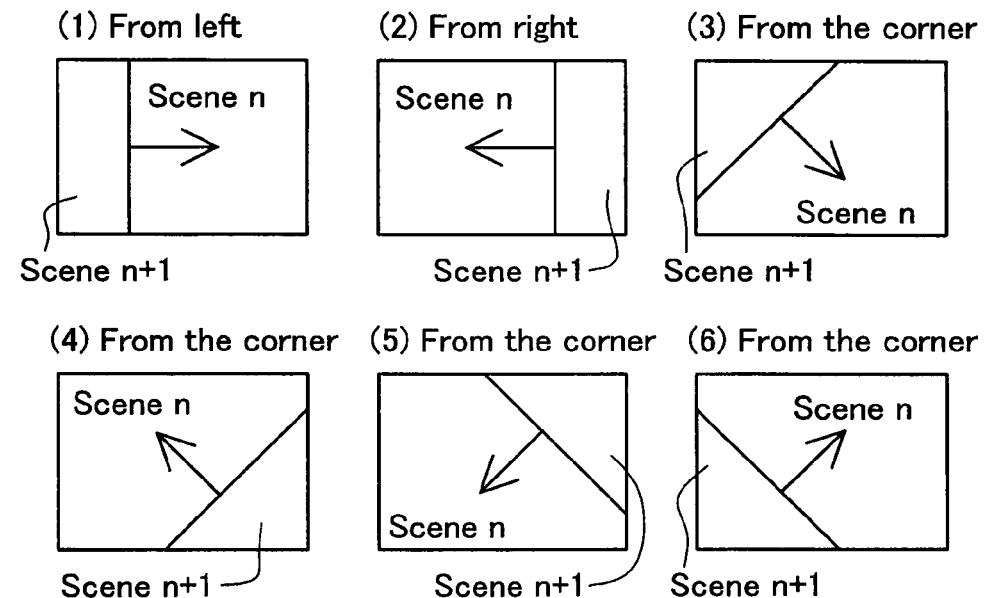
Fig.9b
Wipe
Scene n: wipe-in
(1) Circle     (2) Box     (3) Split
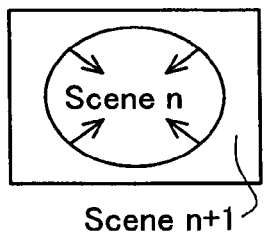 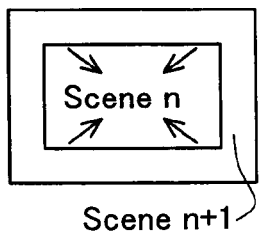 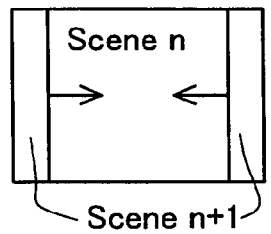
Scene n+1: Wipe-out
(4) Circle     (5) Box
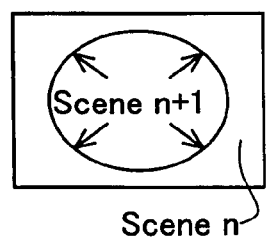 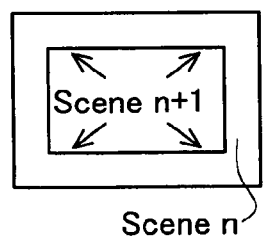

Fig.11
Scene n
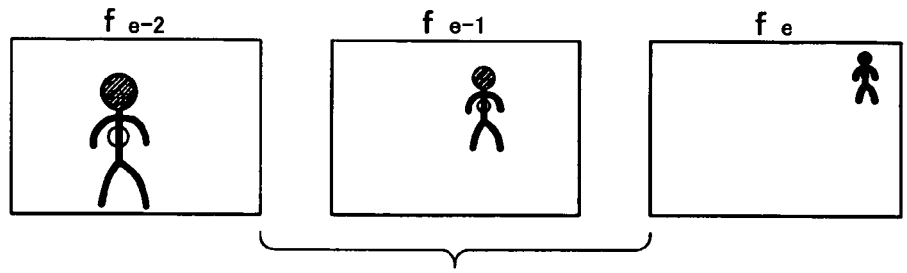
Scene characteristic indicators
- Velocity $|V| > \beta$
- Change in surface area $|\Delta S| > \gamma$
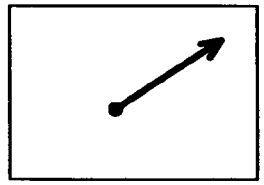
Scene n+1
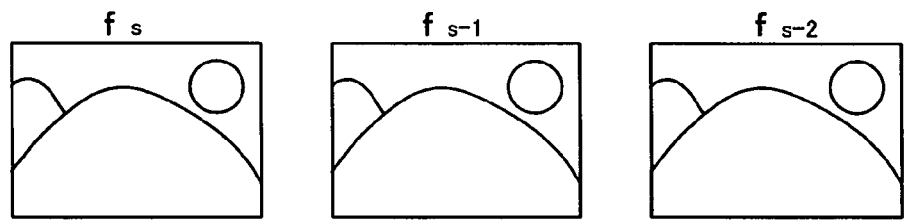
Deformed box transition
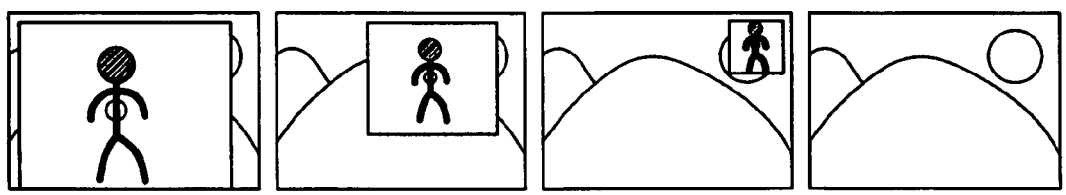

IMAGE PROCESSING DEVICE AND IMAGE PROCESSING METHOD

CLAIM OF PRIORITY

The present application claims priority from Japanese Application P2004-7561A filed in March 2004, the content of which is hereby incorporated by reference into the application.

BACKGROUND

1. Field of the Invention

The present invention relates to image processing technology for joining together multiple scenes extracted from video images.

2. Description of the Related Art

There has long been the need to be able to understand quickly the contents of lengthy video images. To respond to this need, a variety of methods are used to produce "digest videos" (summaries) by extracting multiple representative scenes (images) from the moving image and joining together these representative scenes. For example, the Patent Document 1, listed below, discloses a technology for producing a summary through detecting the positions of changes in status in images, sounds, subtitles, etc., in the video images for the contents of video images stored on a DVD, and then, based on the detected position information, extracting several representative scenes from the video image. Japanese Unexamined Patent Application Publication H10-232884 can be listed as one aspect of such a technology.

In this technology, a digest video wherein the representative scenes have been joined together automatically is a video image that is edited to be shorter than the original video image. Through viewing this digest video, the viewer is able to get an idea of the content of the original video image.

However, in this type of digest image, no thought has been given whatsoever to how the various scenes are joined together, so there is a problem in that the digest video is difficult to watch. One reason for this is that there is no effective process performed for the scene changes because the editing simply joins together various scenes which are unrelated to each other in terms of the content of the video images. Consequently, in order to effectively join together the various scenes, the user has had to set up transition effects after looking at the earlier and later scenes, requiring complex operations. On the other hand, adding new scenes by which to perform specific effects at the scene change parts in order to improve the look extends the overall playback time duration of the digest video. Consequently, it is difficult to add new images when the playback time duration for the digest video has been established in advance.

SUMMARY

The object of the present invention is to solve this problem and to effectively join together multiple scenes that are video images.

The image processing device according to the present invention uses the method described below in order to solve at least a part of the problem described above. In other words, it is an image processing device that joins together multiple scenes, which are video images, comprising:

transition effect storage unit that stores in memory in advance a plurality of types of transition effects used in changing the scenes; scene information extraction unit that extract scene information, which is information indicating the characteristics of the scenes to be joined together; transition effect selection unit that selects, from the stored transition effects, a specific transition effect based on the extracted scene information; and connection unit that join together the scenes using the selected specific transition effect, when joining together the scenes.

Moreover, the image processing method according to the present invention is an image processing method that joins together multiple scenes that are video images, wherein when joining together the scenes, a plurality of types of scene transition effects used when changing the scenes are stored in advance, scene information, which is information indicating characteristics of the scenes that are to be joined together, is extracted, a specific scene transition effect is selected from the stores transition effects based on the extracted scene information, and the scenes are joined together using the selected specific transition effect.

Given a first image processing device and image processing method, a transition effect to be used in the scene change is selected based on scene information from among a plurality of types of scene change effects that have been stored in advance, and the transition effect is used to join together the scenes. It is thus possible to select the transition effect for the scene change by taking into account the characteristics of the scenes, making it possible to join together the scenes automatically. The images that are connected in this way take into account the contents of the scenes, and when outputted and viewed, the scene changes are not difficult to watch.

The scene information in the image processing device having the structure described above can use a variety of information such as the change in brightness of the scenes, data pertaining to camera work (such as pan, tilt, and zoom), or other metadata wherein this data is added to the image in advance, but, in particular, it is possible to use a status indicator that describes the movement of that which is judged to be the object of interest (hereinafter termed the "object") that moves between the multiple frames that comprise a single scene.

When this is done, the characteristics of a single scene can be recognized by the status indicator for the object over the multiple frame images that comprise the scene. Generally, when there is an object in a video image scene the object is the key part of that scene. Representing the scene information for a scene by the status indicator that describes the movement of the object (such as the change in area or the change in position thereof) makes it possible to identify the scene characteristics with ease, making it possible to perform the processing while taking into account the characteristics of the scenes to be joined together.

Here, for the two scenes to be joined together, the scene information may be extracted based on frame images, where a certain number of frame images are extracted sequentially from the end of the scene that is sequentially earlier and/or sequentially from the beginning of the scene that is sequentially later.

Given this image processing, a specific number of frame images are extracted from the end and/or beginning of the two scenes to be joined together. The scene information for these scenes is extracted based on these frame images that have been extracted. In other words, information is not required for the scene as a whole, but rather it is possible to extract the scene information using only the information for the frame images in the part that is to be joined.

The extraction of scene information using the structure described above may be done through detecting the amount of shift between the aforementioned frame images that have been extracted in order to determine the aforementioned object by correcting for the amount of shift, and then calculating the status indicator for the object.

Given this image processing, even if scene information is added in advance to the scenes to be joined together, it is possible to recognize the object information by performing calculations between the frame images in a portion of the scene. This makes it possible to perform effective scene joining, matching various types of video images.

The aforementioned scene information may include the length of each of the aforementioned scenes, where the number of frame images extracted will depend on the length of the scene.

Given this image processing, if the scene is long, then many frame images will be extracted, but if the scene is short, then few images will be extracted. In other words, it is possible to extract scene information based on an appropriate number of frame images, enabling effective processing.

The transition effect in the image processing described above may be, at least, a cut, a slide, a wipe, or a fade. The use of these transition effects enables the scenes to be joined together effectively.

The aforementioned scene information may include the aforementioned scene length, where a cut may be selected as the aforementioned transition effect for scene shorter than a specific length.

Given this image processing, a cut is selected as the specific transition effect for short scenes where the original length is shorter than a specific length. In other words, no processing is applied to the frame image at the end and/or beginning frame images of the scenes to be joined together, but rather the scenes are joined together as they are. Doing so makes it possible to join together effectively scenes, such as action scenes, that change frequently.

Here the relationships between the transition effects and the patterns for the relationships between the two scenes to be joined together may be stored in advance in memory, and the patterns of the relationship between the two scenes to be joined together can be extracted based on the scene information, in order to select the transition effect based on the pattern by referencing the relationship that has been stored in advance.

Doing so makes it possible to select with ease the scene transition to be used by setting a transition effect for each pattern after establishing patterns for the relationships between the two scenes when selecting the transition effect, taking into account not only the characteristics of one scene, but also the scene information for the other scene to be joined together as well.

Note that the ends of the two scenes may be connected through overlapping when joining together the two scenes.

Doing so overlaps the ends of the two scenes to be joined together to thereby output a single video image, thereby making it possible to reduce the overall length of the outputted video image. For example, new combined frame images, taking into account the transition effect, can be generated from a certain number of frame images from the end part of a scene 1 and a certain number of frame images from the beginning part of a scene 2 to use composite frame images in the part wherein scene 1 and scene 2 overlap. By joining the two scenes in this way, it is possible to reduce the overall length of the video image generated while taking into consideration the transition between scenes.

In the aforementioned image processing, it is possible to include the speed of movement of the object, as the state indicator for the object in the scene information, and the speed of change of the aforementioned specific transition effect may be adjusted based on this speed of movement when joining scenes together.

Doing so makes it possible to adjust the speed with which the transition effect changes so as to center the movement of the object, making it possible to perform a transition effect that places priority on the object in the display, such as transitioning between scenes gradually while displaying the object over an extended period of time.

When extracting scene information, it is possible to add dummy scenes prior to the scene that is first sequentially and/or after the scene that is last sequentially, of all of the scenes to be joined together, where dummy scenes added before the first scene and/or after the last scene may be joined together using a specific transition effect.

Doing so makes it possible to add a specific transition effect at the beginning part and/or the end part of the video image that is generated as the result of joining together the multiple scenes, making it possible for the outputted video image to be even more effective.

The present invention can be packaged as a computer program or as a recording medium on which a computer program is recorded.

BRIEF DESCRIPTION OF THE DRAWINGS

FIG. 9a is an explanatory drawing illustrating the types of transition effect when the transition is a slide.

FIG. 9b is an explanatory figure illustrating the types of transition effect when the transition is a wipe.

FIG. 11 is an example of the use of a box wipe.

DESCRIPTION OF THE PREFERRED EMBODIMENTS

Forms of embodiment of the present invention will be explained sequentially based on the embodiments of embodiment below.

A. First Embodiment:
A1. Structure of the image processing device
A2. Image processing
A3. Scene characteristic indicator calculation process
A4. Group determination process
A5. Scene transition setup process
B. Second Embodiment
C. Alternative Embodiments

A. First Embodiment

A1. Structure of the Image Processing Device

Figure 1:
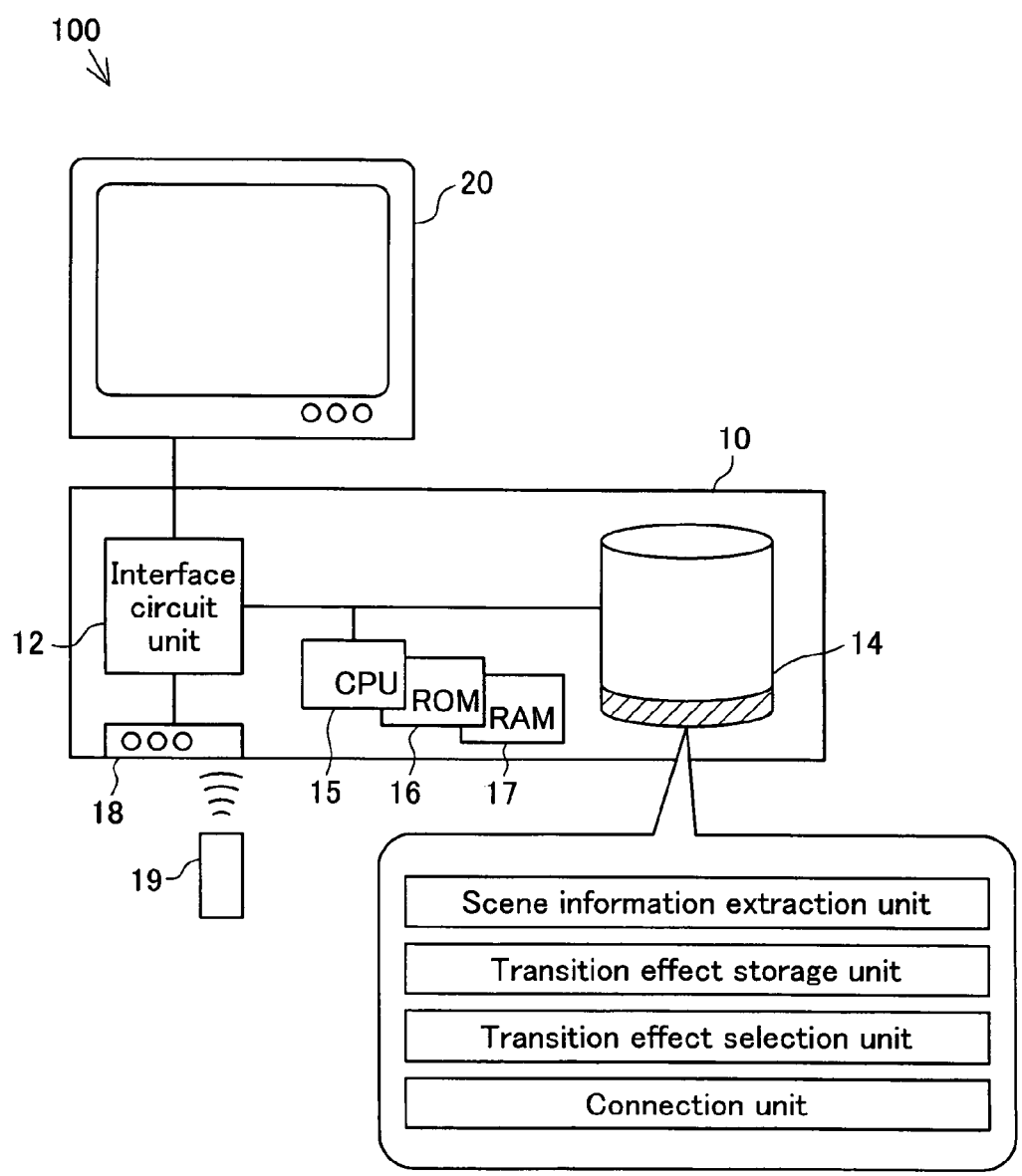
FIG. 1 is an explanatory figure showing an image processing system that is a first embodiment according to the present invention.

FIG. 1 is an explanatory figure showing an image processing system 100 that is a first embodiment according to the present invention. As is shown in the figure, this image processing system 100 comprises a hard disk drive (HDD) recorder 10 that records and plays back specific video images, a TV monitor 20 that is connected to the HDD recorder 10 and that displays the video images, and the like.

The HDD recorder 10 has a variety of functions for editing the stored video images. For example, there is an indexing function that detects automatically changes in scenes in the video image to create an index (with thumbnails) of frame images that represent each scene, and a digest function that extracts a portion of the video image for each scene and that joins together these portions to produce a digest video. This type of automatic detection of scene changes is performed through the detection of changes in the colors, brightness, etc., in the multiple frame images that comprise the scene (the video image). In other words, HDD recorder 10 has multiple scenes for generating a digest video for a single video image.

This HDD recorder 10 comprises an interface circuit unit 12 that controls the input and output of video images and user operations, a hard disk 14 that records the video images through the interface circuit unit 12, a CPU 15 that controls the various functions of the HDD recorder 10, a ROM 16, a RAM 17, and so forth, and records, as digital data, the inputted video images.

The interface circuit unit 12 is connected to a television (TV) monitor 20 and an operating panel 18, where the video images received by the TV monitor 20 are inputted according to user requests through the operating panel 18. If the received video image is in the form of analog data, the interface circuit unit 12 converts the video image into digital data. Note that the operating panel 18 is equipped with an infrared photoreceiver unit, making it possible to operate the HDD recorder 10 through operating an external remote control 19.

This HDD recorder 10 is equipped with a terminal that is connected to a personal computer, not shown, making it possible to read into the personal computer the video images stored on the hard disk 14. Note the HDD recorder 10 may be equipped with a DVD-R drive that outputs to a recording medium the video images already stored on the hard disk 14.

The hard disk 14 is equipped with a high capacity storage region that stores video images, and a storage region that stores the programs that perform the various functions of the HDD recorder 10. In the later of these storage regions are stored the programs for the functions described above for editing the video images, along with image processing programs for effectively joining together multiple scenes (hereinafter termed "image processing programs").

These image processing programs are, primarily, that which performs the function that extracts the scene information that comprises the characteristics of the two scenes to be joined together, the functions that store in advance the plurality of types of transition effects used in the scene transitions, the functions that select the scene transitions, based on the scene information, used in the joining together of the scenes, and the functions that join together the scenes using the selected transition effects. In other words, the HDD recorder 10, provided with these image processing programs is an image processing device equipped with the "scene information extraction unit," "transition effect storage unit," "transition effect selection unit," and "output unit," of the patent claims.

In the image processing system 100 structured in this way, the image processing programs are executed by the CPU 15, working together with the ROM 16 and the RAM 17, when the user uses the operating panel 18 to perform an editing operation on a specific digest video stored on the hard disk 14. Note that the digest video after the execution of the image processing is stored on the hard disk 14, and, when necessary, is played back on the screen of the TV monitor 20.

Figure 2:
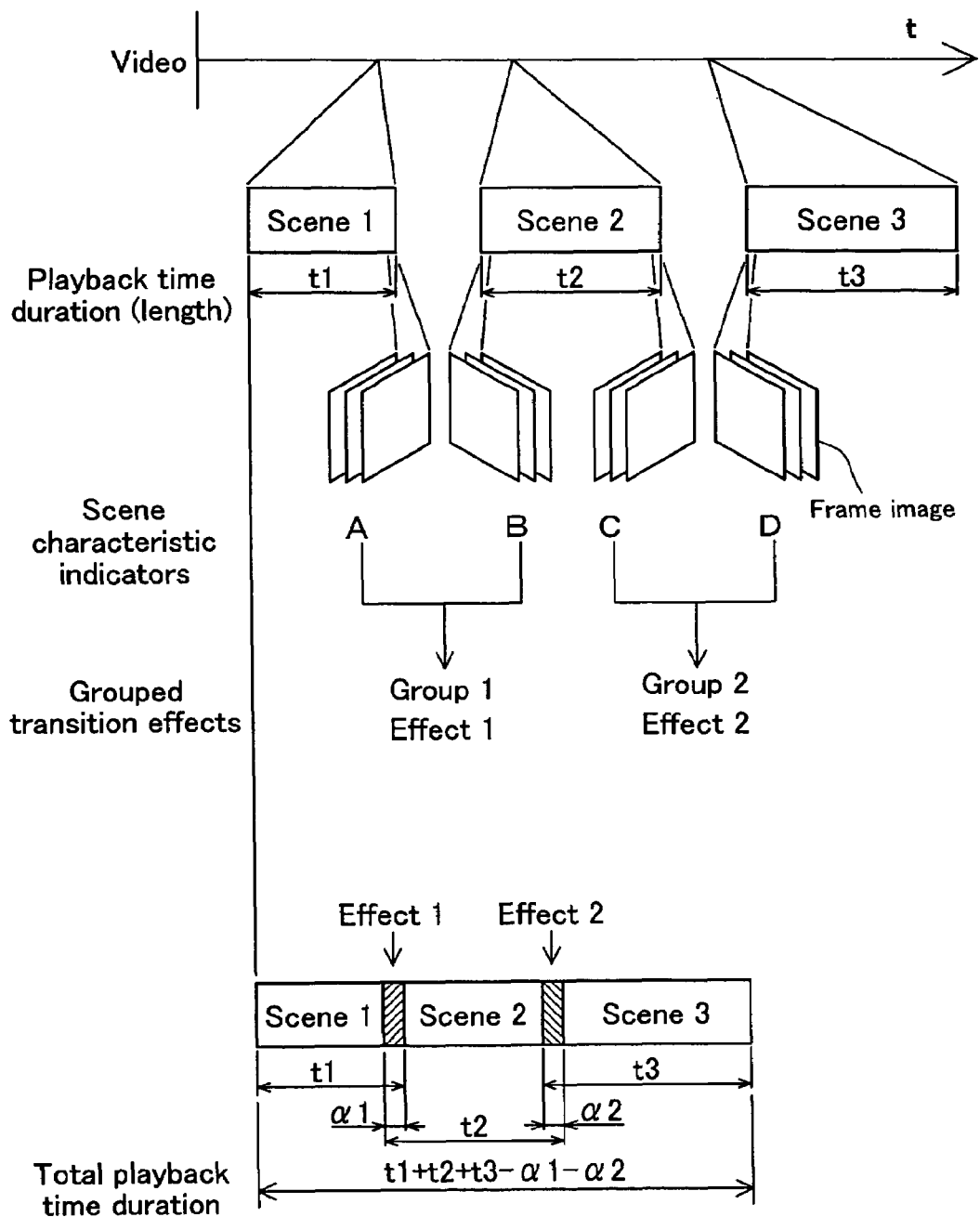
FIG. 2 is a schematic drawing of the image processing in the first embodiment.

A schematic diagram of this series of image processes is shown in FIG. 2. As is shown in the figure, when joining together two scenes, the scene transition effect is selected, and the scene transition is performed using the scene transition effect when joining together the two scenes. For example, when joining together a scene 1 and a scene 2 on the hard disk 14, a certain number of sequential frame images are extracted from the end of the scene 1, and a certain number of sequential frame images are extracted from the beginning of the scene 2. A characteristic indicator A, as the scene information for the scene 1, and a characteristic indicator B for the scene 2, are extracted from the multiple frame images that have been extracted, and the relationship between the scene 1 and the scene 2 is categorized into a group based on both of these characteristic indicators A and B. A transition effect 1 is selected, based on this group categorization, from the transition effects that have been stored in advance. For example, an image effect is selected such as the transition effect 1 being a wipe and a transition effect 2 being a slide. The two scenes are joined together through the use of the selected transition effect. In this way, the scene change takes into account the contents (characteristic indicators) of the scenes that are joined together. Note that the characteristic indicators of the scenes and the transition effects will be explained in detail below.

In the schematic diagram shown in FIG. 2, overlaps, wherein the parts wherein the individual scenes are joined together overlap each other, are used in the scene changes for scene 1, scene 2, and scene 3. Specifically, the part wherein scene 1 and scene 2 are joined together is the playback time duration part corresponding to time $\alpha 1$, and the part wherein scene 2 and scene 3 are joined together is the play back time part corresponding to time $\alpha 2$, where there are overlapping parts in each. The total playback time duration of the video image generated in this way is shorter, by the overlap times ($\alpha 1$ and $\alpha 2$), then that of the case wherein each of the scenes are merely joined together. These video processes will be explained in detail below.

Figure 3:
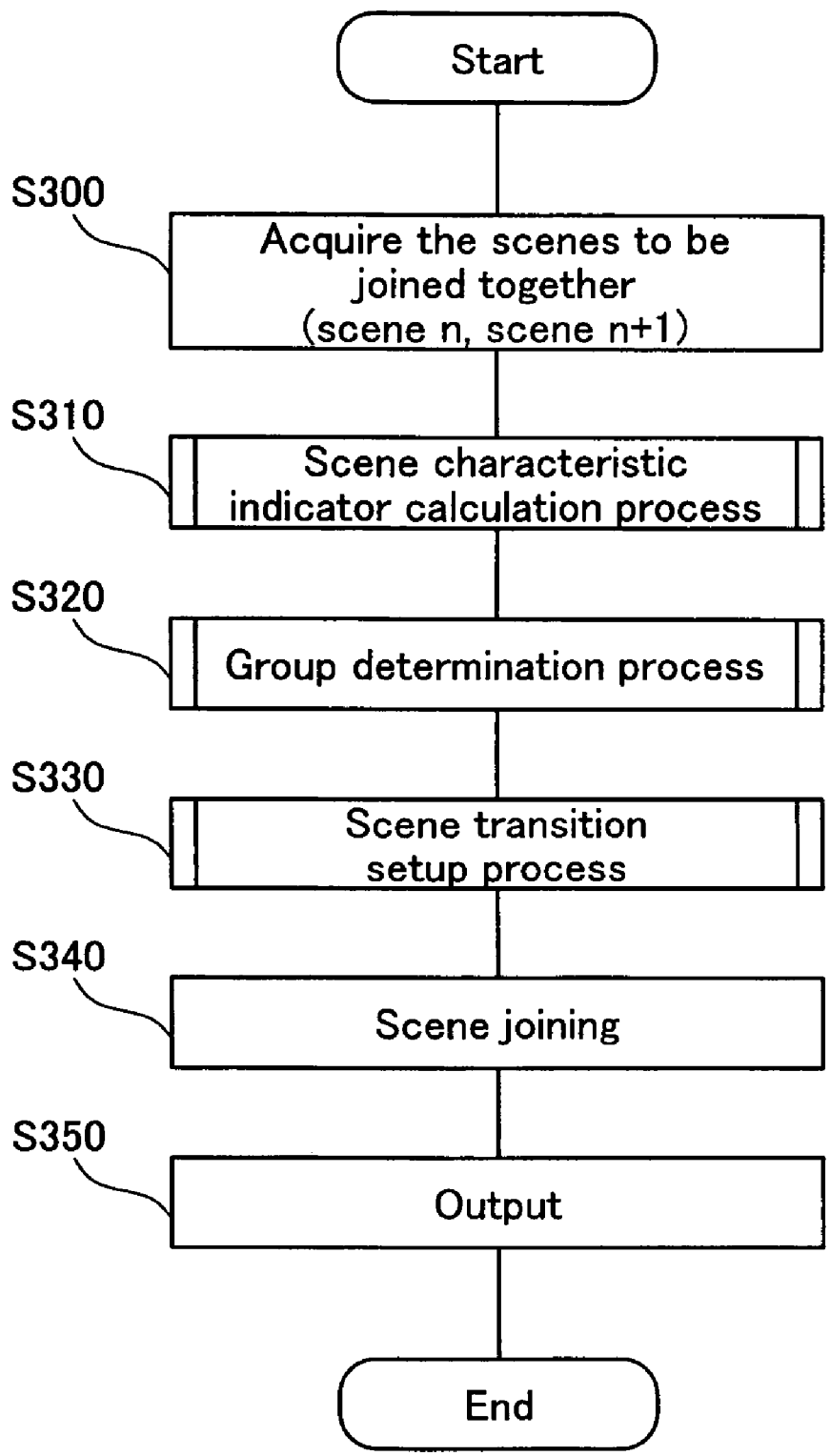
FIG. 3 is a flowchart for the image processing in the first embodiment.

A2. Image Processing:

FIG. 3 is a flowchart of the video processing in a first embodiment of joining together multiple scenes extracted from the video images. In a video processing system 100, which has the hardware structure described above, the CPU 15 reads out a video processing program from the hard disk 14 and displays an operating screen for the editing operations on the TV monitor 20 when the user operates the operating panel 18 of the HDD recorder 10. This operating screen displays, for example, a list of titles of the video images recorded on the hard disk 14 of the HDD recorder 10, and the CPU 15 executes video processing when the user uses the operating panel 18 to select the title of the video image to be edited.

When the video processing begins, the CPU 15 reads out two scenes that are sequential in a time series (scene n and scene n+1) of the multiple scenes in the selected video image. (Step S300)

The CPU 15 performs a process that calculates the characteristic indicators that indicate the characteristics of each scene for scene n and scene n+1 that have been read out. (Step S310) Generally, the information in a single scene (the scene information) is information such as changes in brightness and changes in color in the image, camera work such as panning and tilting, movement of the object in the scene, length of the scene, and so forth. This type of information can be obtained through scanning the multiple frame images that comprise the scene. Of the various types of scene information, the present embodiment uses information regarding the movement between frames corresponding to the "movement of the object." In other words, the object is determined based on the frame images that comprise a scene, and the changes in the situation, such as the changes in position and changes in area, of the object between frame images are extracted as the characteristic indicators for the scene. In the below, "characteristic indicators of the scene" refers to information regarding the object in the frame image, where the "scene information" refers to the various types of information included in the "characteristic indicators of the scene." Note that the scene characteristic indicator calculation processes for extracting the characteristic indicators of the scenes will be explained below.

Based on the characteristic indicators extracted for each scene in Step S310, the group that contains the joining together of scene n and scene n+1 is selected. (Step 320) In the present embodiment, the scenes to be joined together are broadly categorized into four groups (Group 1 through Group 4) depending on whether or not there are objects in the respective scene n and scene n+1. For example, if there is an object in scene n and there is no object is scene n+1, then the joining will be in Group 1. This group determination process makes it possible to select the transition effect depending on the relationship between the two scenes to be joined together. Note that the details of the group determination process will be explained below.

Based on the group determined in Step S320, the transition effect to be used in joining together the scenes is selected and the details of the transition effect are set up. (Step S330) The transition effects used when changing scenes include all types of image effects (transitions) such as cut, slide, wipe, fade, dissolve, spiral, zoom, and so forth, along with processes that overlap two scenes, processes which connect the scenes as they are, processes that expand or shrink the two scenes, processes that display both scenes at the same time, and so forth. Although in the present embodiment the scene transition effect is primarily set up as a transition, it is also necessary to set up the details for the transition. For example, for a slide transition, it is necessary to set up the direction and speed of the slide. These details for the transition are set in Step S330.

If, for example, the joining is in the aforementioned Group 1, then a slide is used in the scene change from scene n to scene n+1. The slide is an image effect wherein, for example, scene n+1 gradually enters into the frame image in harmony with the movement of the object in scene n to ultimately switch to the scene n+1. During the transition time from this scene n to this scene n+1 (that is, during the time over which the slide effect is performed), the two scenes are in an overlapping state.

Figure 4:
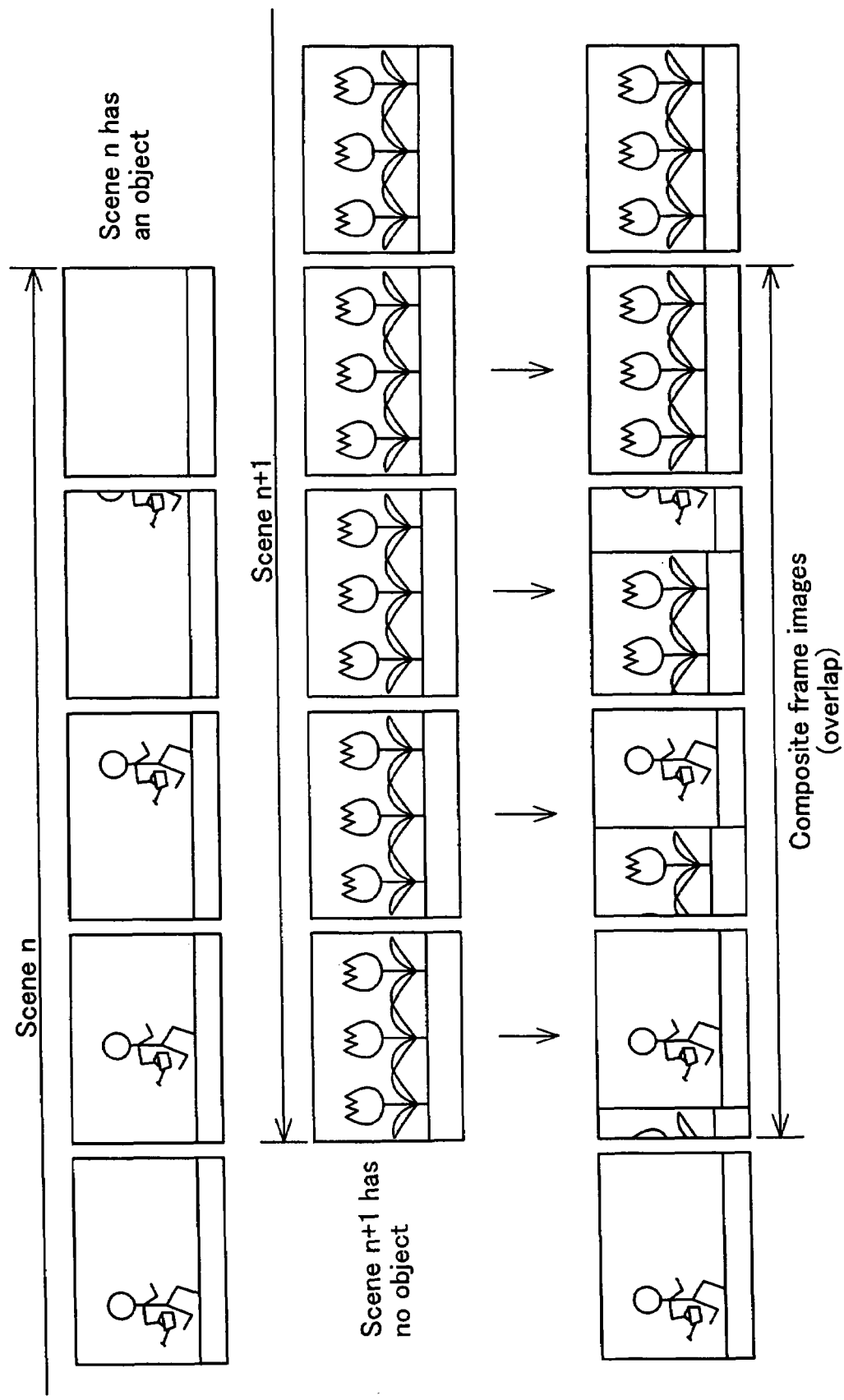
FIG. 4 is an explanatory drawing of a composite frame image in the first embodiment.

The process of joining together the two scenes is performed using the image effect determined in this way. (Step 340) Specifically, as is shown in FIG. 4, the slide effect is used to generate overlapping composite frame images for various frame images from scene n and scene n+1. In the embodiment shown in FIG. 4, four composite frame images are produced, joining together the scene by producing four composite frame images and replacing the four frame images from the end of scene n and the four frame images from the beginning of scene n+1 with the composite frame images.

Having passed through the process described above, the video image wherein the scenes have been joined together is outputted to the hard disk 14 (Step S350) for storage. This sequence of processes is performed repetitively if there are other scenes to be joined together. On the other hand, if there are no other scenes to be joined together, then, in addition to being stored on the hard disk 14, the outputted video image is played back on the screen of the TV monitor 20.

A3. Scene Characteristic Indicator Calculation Process

Figure 5:
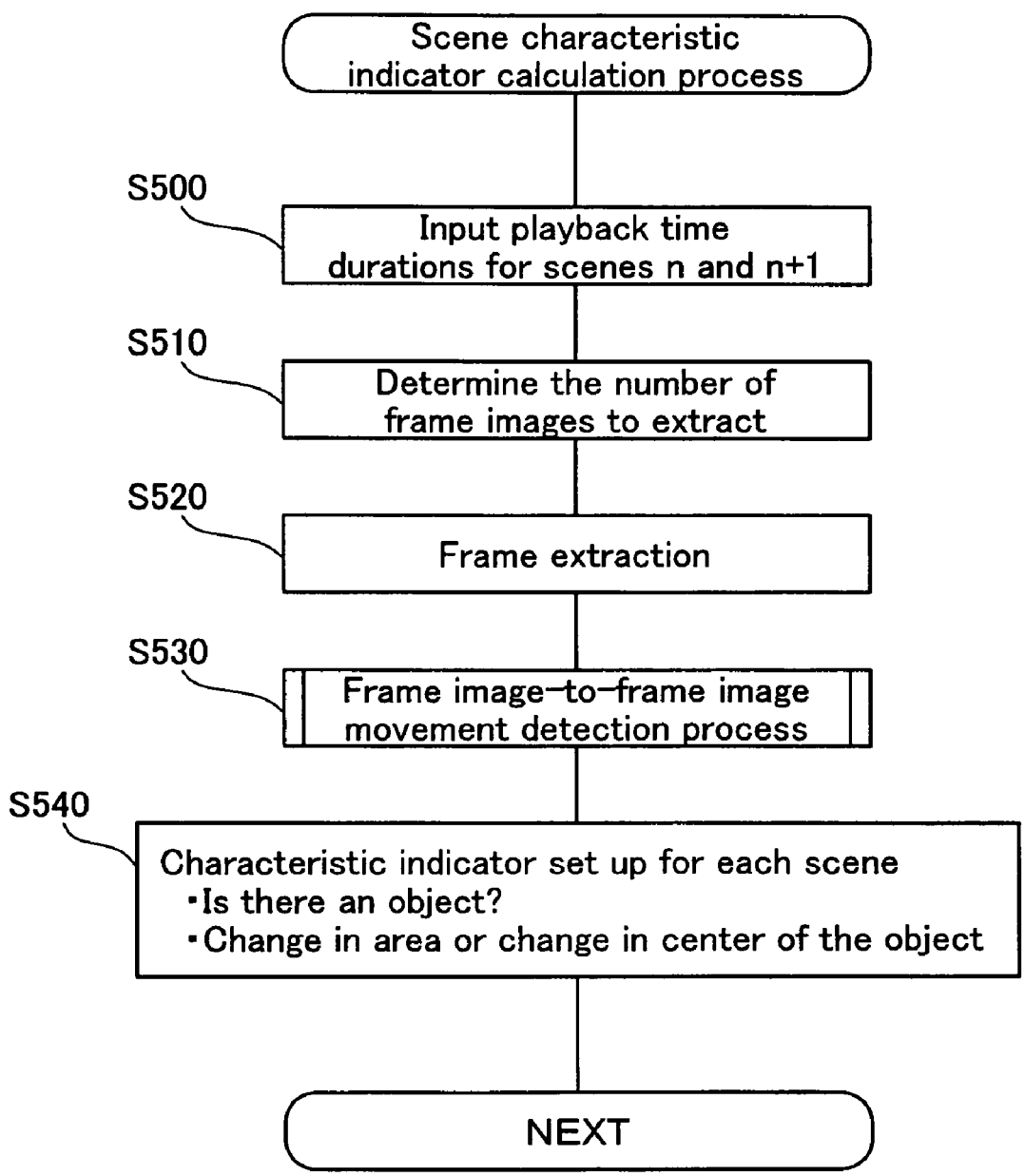
FIG. 5 is a flowchart for a scene characteristic indicator calculation process.

FIG. 5 is a flowchart for the scene characteristic indicator calculation process that calculates the characteristic indicators of a scene from the frame images that comprise the scene. When the process starts, the CPU 15 inputs both scene playback time durations for scene n and scene n+1 to be joined together. (Step S500) in the present embodiment, each of the multiple scenes in the HDD recorder 10 has added playback time duration (length) information.

Figure 6:
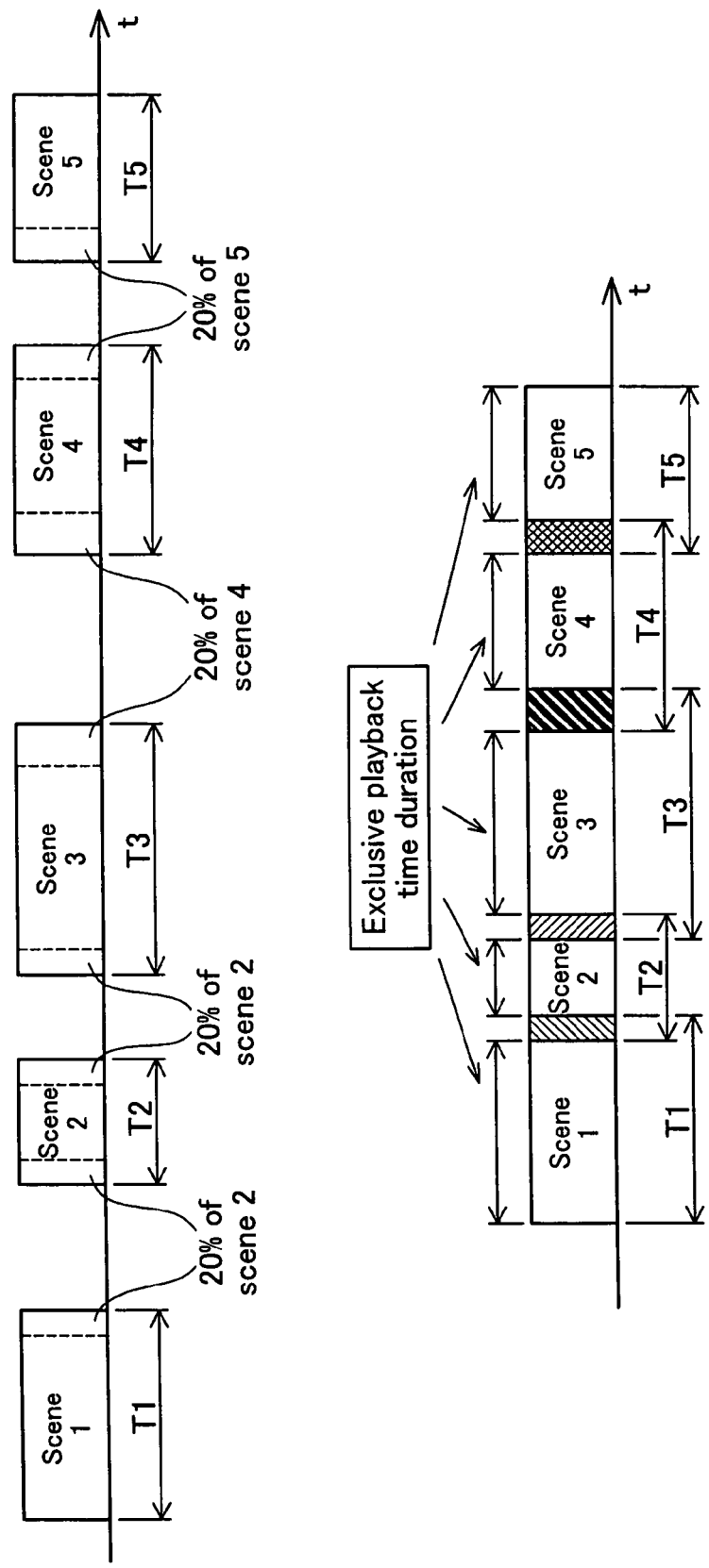
FIG. 6 is an explanatory drawing for the number of frame images extracted.

Following this, the number of frame images m to be extracted is determined based on the length of each scene. (Step S510) This number of frame images m to be extracted is based on the shorter of the lengths of scene n and scene n+1, and is determined so as to preserve a specific amount of time wherein the scene that serves as the standard will be played back by itself. For example, as is shown in FIG. 6, when scene 1 and scene 2 are to be joined together, the number of frame images to be extracted m is determined corresponding to 20% of the playback time duration T2 of scene 2, which is the shorter of the two scenes (i.e., T1>T2). Following this, when joining together scene 2 and scene 3, a number of scene images corresponding to 20% of the playback time duration of scene 2, which is the shorter of the scenes (that is T3>T2) are extracted. In this way, the number of scene images to be extracted m is determined based on maintaining about 60% of the overall playback time duration to be exclusive playback time duration for each of the scenes by using as the reference the scene that is the shorter of the two.

Note that the proportion of the exclusive playback time duration is not limited to 60%, but rather may be a default value inputted by the user. Moreover, if, for example, two long scenes, for which the playback time duration exceeds several minutes, are joined together, the number of frames to be extracted may be a number that is set in advance. In this case, if, for example, each of the scenes is longer than three minutes long, then a number of frame images corresponding to 20 seconds may be set. Moreover, a number of frames corresponding to 20 seconds may be set for scenes between three and four minutes long, a number of frame images corresponding to 25 seconds may be set for scenes between four and five minutes long, etc., to setup in advance the number of frame images to be extracted depending on the lengths of the scenes.

Returning to FIG. 5, a number of frame images m, determined in this way, are extracted from each of the scenes. (Step S520) Specifically m frame images are extracted from scene n, which is the earlier scene in the time series, working backwards from the end of the scene, and m frame images are extracted from scene n+1, which is the later scene in the time series, working forwards from the beginning of the scene.

Following this, a frame image-to-frame image movement detection process is performed for the m frame images extracted from each of the scenes. (Step S530) This movement detection process compares, of all of the m frame images that were extracted, the first of the frame images in the time series to the next frame image connected thereto in order to determine an object, and in order to trace the change in status of the object over time.

Figure 7:
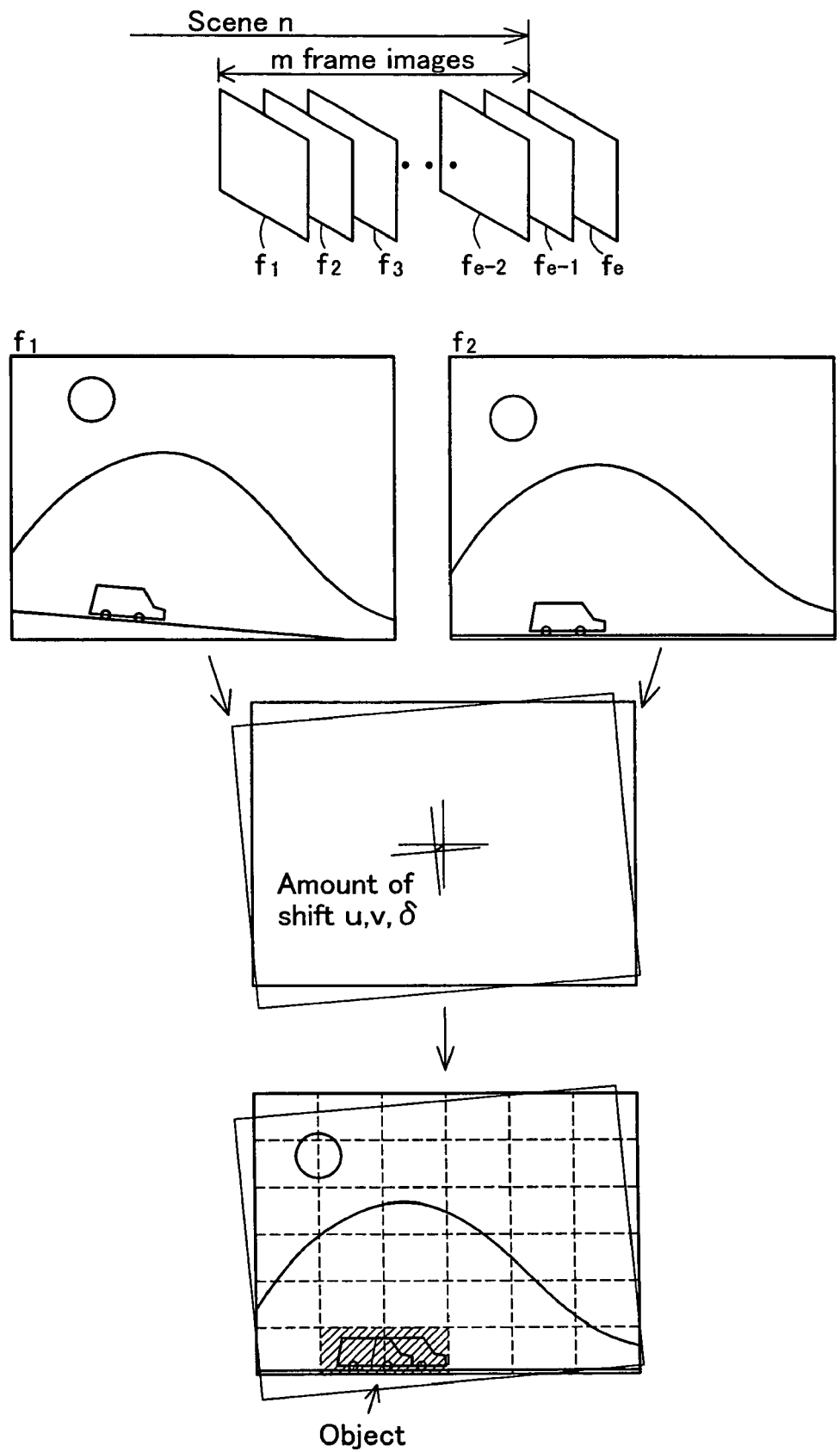
FIG. 7 is an explanatory drawing for the object detection process.

Specifically, as is shown in FIG. 7, a frame image f1 and a frame image f2, in a time series, are extracted from the multiple frame images (f1 to fe), extracted from the scene n. For both of the extracted frame images, a known gradient method is used to calculate the amounts of translational positioning shift (u, v) between the frame images and the amount of rotational shift δ. The alignment of the frame image f2 onto the frame image f1 is corrected based on the calculated shifts (u, v and δ). This correction corrects the positional shift between the two frame images. Each of the frame images after this correction is divided into a specific number of blocks, and shifts (ub, vb, δb), are similarly calculated between each pair of corresponding blocks between the two frame images. Here the block-to-block shifts that are calculated exclude the positioning shift between the two frame images as a whole, and thus represent "movement" within the image. In other words, the CPU 15 identifies as the object that area wherein the block-to-block shift is greater than a threshold value. Similarly, the movement detection process is performed for frame image f2 and frame image f3, and the area and center of the object are calculated for each frame image (in the time series).

The process of Step S530 shown in FIG. 5 is performed for scene n+1 as well, setting, as characteristic indicators for each scene, information as to whether or not there is an object, and changes in the area and position of center of the object, (Step S40), after which the process is ended in "NEXT."

Note that the method for calculating the area and position of the center, etc., of the object is not limited to this method. For example, if the object is known in advance, a template can be prepared in advance to detect changes in the object by performing pattern matching in each frame image. Moreover, for a single frame image, pattern matching can be performed, and the characteristic indicators of brightness and color frequencies can be detected, and these characteristic indicators can be put into a histogram for use in tracking. Moreover, if metadata that stores the movement of the object in advance is stored as scene data at the time of filming, it will be possible to set the characteristic indicators for the scene without performing these types of calculations.

A4. Group Determination Process

Figure 8:
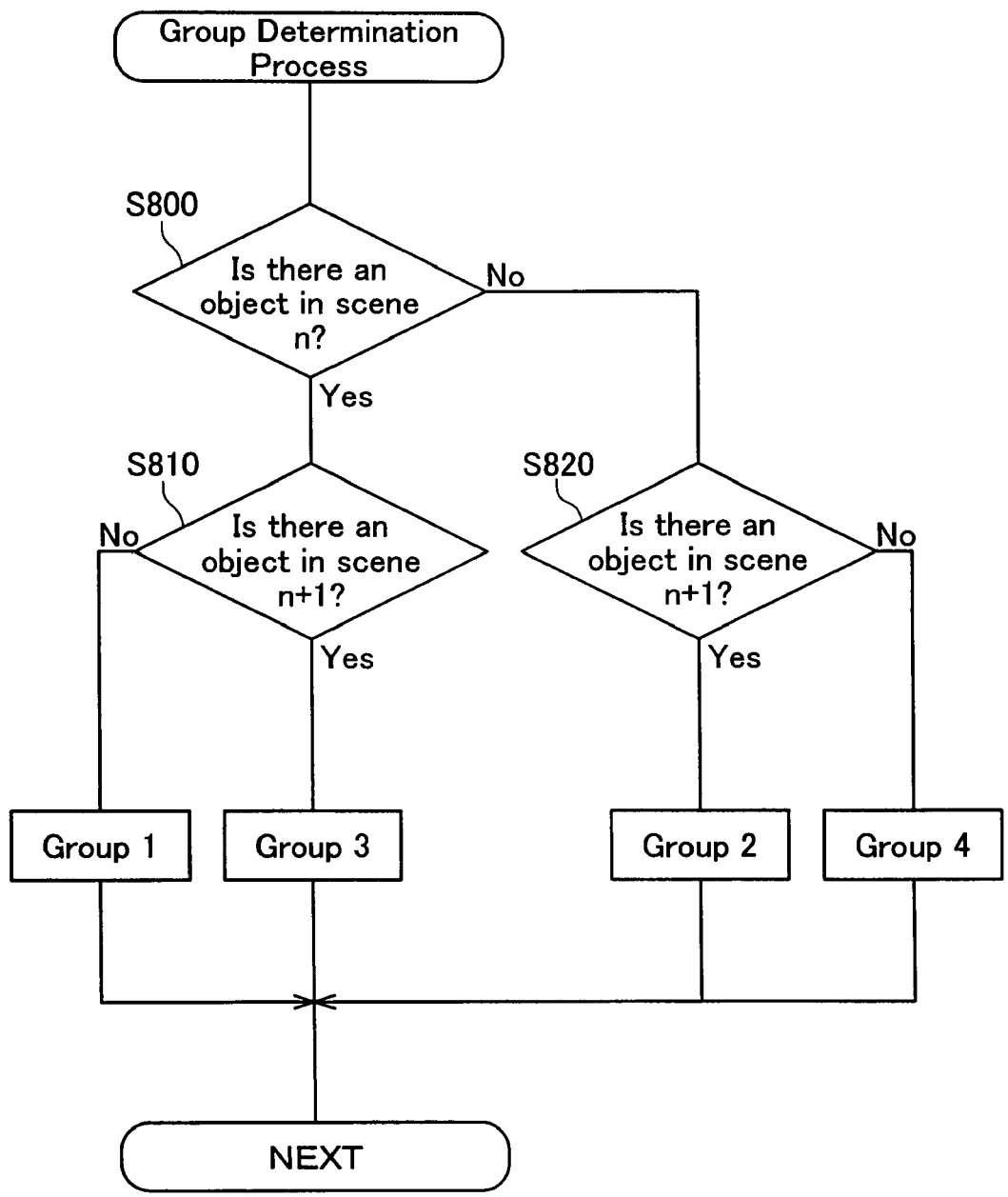
FIG. 8 is a flowchart for the group determination process.

FIG. 8 is a flowchart of the group determination process that categorizes the relationship between the two scenes to be joined together. As described above, this categorization is done through focusing on the objects which are the characteristic indicators in the two scenes.

First the CPU 15 determines whether or not there is an object in scene n. (Step S800) If in this step it is determined that there is an object in scene n, then the CPU determines whether or not there is an object in scene n+1. (Step S810)

If it is determined in Step S810 that there is an object in scene n+1, then the relationship between the two scenes is set as being in "Group 3," but if it is determined that there is no object in scene n+1, then the category is set as "Group 1," and the process is completed with NEXT.

On the other hand, if, in Step S800, it is determined that there is no object in scene n, then next a determination is made as to whether or not there is an objects in scene n+1. (Step S820).

If, in Step S820, it is determined that there is an object in scene n+1, then the relationship between the two scenes is categorized into "Group 2," and if there is no object in scene n+1, then the relationship between the two scenes is categorized as being in Group 4, and the process is terminated at NEXT.

In other words, if there is an object in only scene n, then the group is categorized as Group 1, if there is an object in only scene n+1, then the group is categorized as Group 2, if there are objects in both scenes, then the group is categorized as Group 3, and if there is no object in either scene, then the group is categorized as Group 4. The image effect patterns described below are established for each of these broadly-categorized four groups in order to overlap and join together the two scenes.

A5. Scene Transition Setup Process

There are a variety of different image effects used in scene changes, such as the well-known transitions such as cut, fade, slide, and wipe, discussed above, in addition to, for example, wipe-in and wipe-out, depending on the movement. FIG. 9a and FIG. 9b each show embodiments of this type of image effect (transition). As is shown in FIG. 9a, even for, for example slide in, there are multiple types depending on the direction. Moreover, as shown in FIG. 9b, even for wipe, there are many different types, such as circle wipe, box wipe, split wipe, and so forth, depending on the shape.

The six types of transition effects, slide in/out, shown in FIG. 9a, the circular wipe in/out effects shown in FIG. 9b, and the shrink effect wherein a scene is gradually shrunk are provided in the first embodiment for setting up the transitions for each of the categorized groups. Specifically, for Group 1, slide-in is used for scene n+1 or wipe-in is used for scene n, for Group 2, slide-out is used for scene n or wipe-out is used for scene n+1, for Group 3 shrink is used for scene n, and for Group 4 slide-out is used for scene n.

Figure 10A:
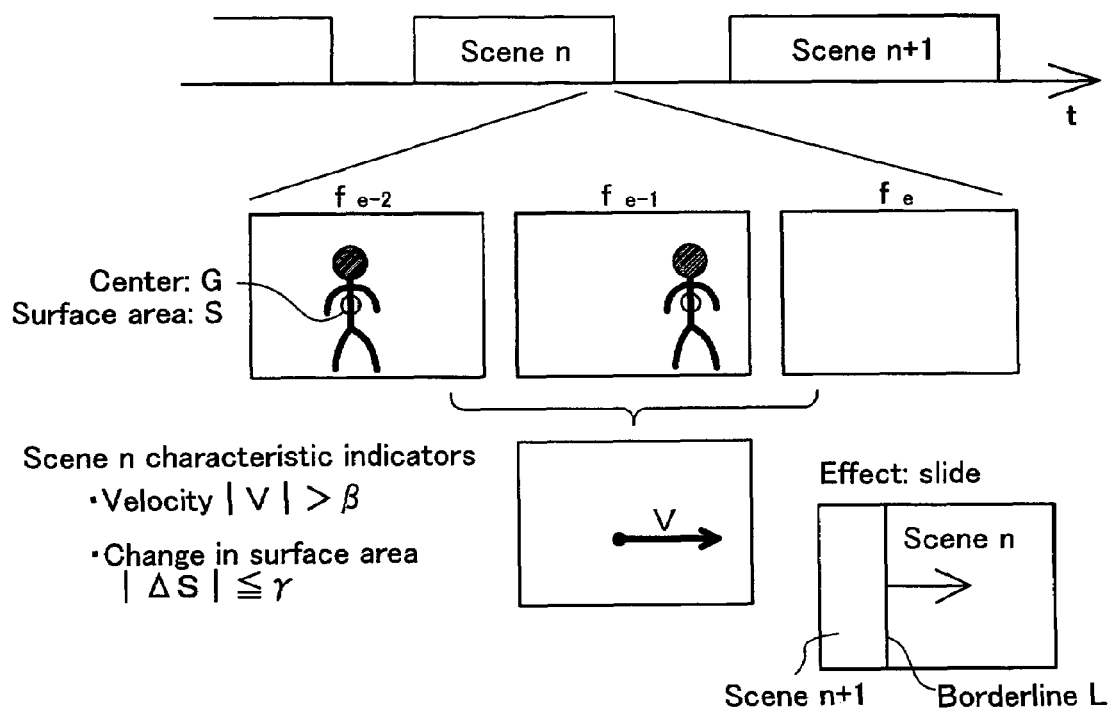
FIG. 10a is an explanatory figure showing the situation when a transition has been performed using a slide when the relationship between the two scenes to be transitioned is in Group 1.
Figure 10B:
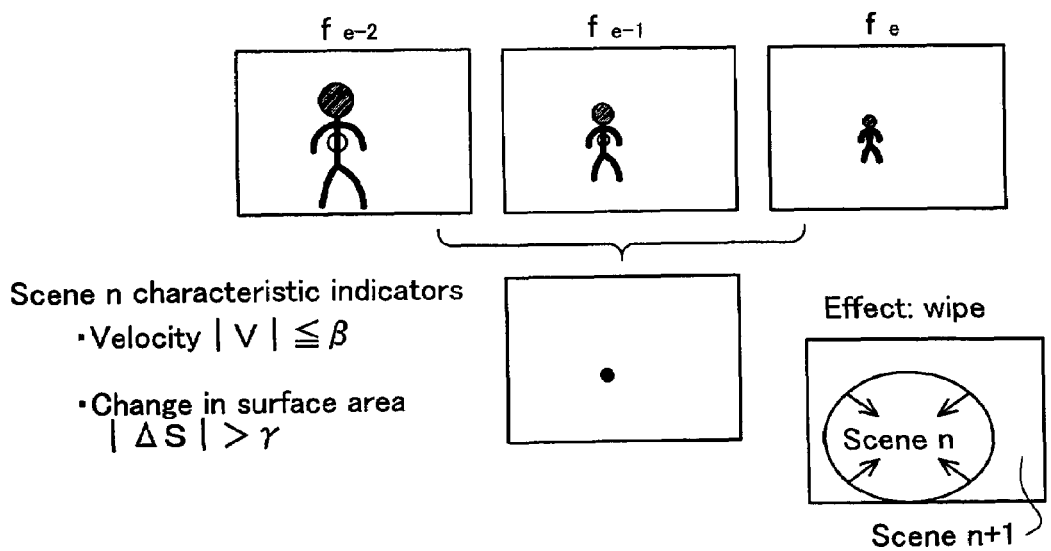
FIG. 10b is an explanatory figure showing the situation when a transition has been performed using a wipe when the relationship between the two scenes to be transitioned is in Group 1.

FIG. 10a and FIG. 10b illustrate the situation of the process wherein the relationship between the two scenes to be joined together is in Group 1. As shown in the figures, there is an object (in this case, a person) in scene n alone, where either a slide-in is used in switching to scene n+1 (FIG. 10a) or a wipe-in is used in switching from scene n (FIG. 10b). As is shown in FIG. 10a, when the object moves out of the frame by moving from the left to the right in the frame image to end the scene, then a slide-in from the left of scene n+1 is used. On the other hand, as is shown in FIG. 10b, when the object does not go out of the frame, but rather the scene ends with the object far away within the frame, then a wipe-in of the scene n is used.

The details of the changes in these transitions are set according to the movement of the object. For example, in FIG. 10a the direction and speed of the slide-in of scene n+1 are set based on the velocity V calculated from the change in the center of the object, as the characteristic indicator of the scene n. In other words, the direction of the slide-in is set according to the direction of movement of the object, where the boundary line L of the slide-in is given a velocity that places priority on the object so as to not hide the object. Moreover, in FIG. 10b, the center of the wipe-in of scene n is set based on the position of the center of the object, which is largely stationary. Of course, it is not absolutely necessary to change proportionally with the velocity of the object, but rather the change can be at a velocity and position that are set in advance.

Note that the choice between slide-in and wipe-in in Group 1 can be done based on a decision as to whether or not there is an object in the final frame image fe in the scene n, and may also be based on a decision from the characteristic indicators of the scene. When using the characteristic indicators of the scene, it is possible to decide whether or not the velocity V of the object is greater than a specific value β. If the velocity V is larger than the specific value β, then slide-in may be selected, and if the velocity V is less than the specific value β, then wipe-in may be selected.

Moreover, the aforementioned wipe-in may be used under specific circumstances. FIG. 11 is an embodiment of the use of a box wipe, where a deformed box transition is set up wherein the center of the wipe moves along with the object. This transition may be used if the velocity V of the object in scene n is larger than the specific value β and the change in the area ΔS of the object is greater than a specific value γ.

Furthermore, a wipe-in may be used at the center of a skin-tone region within the object after detecting, as the characteristic indicator if the scene, a skin-tone region. In particular, if the object is a person, it is possible to display, for example, the face of the person until immediately prior to the scene change.

In the same manner as for Group 1, described above, when the relationship between the two scenes to be joined together falls into Group 2, the transitions are set up focusing on slides and wipes. Note that, in contrast to Group 1, in Group 2 only scene n+1 has an object. Consequently, the priority is on displaying the object in scene n+1, which will be displayed next, and so either a slide-out of scene n, or a wipe-out of scene n+1 will be used. Note that the change in the transition (for example, the speed) is set in the same manner as for Group 1, discussed above.

Figure 12:
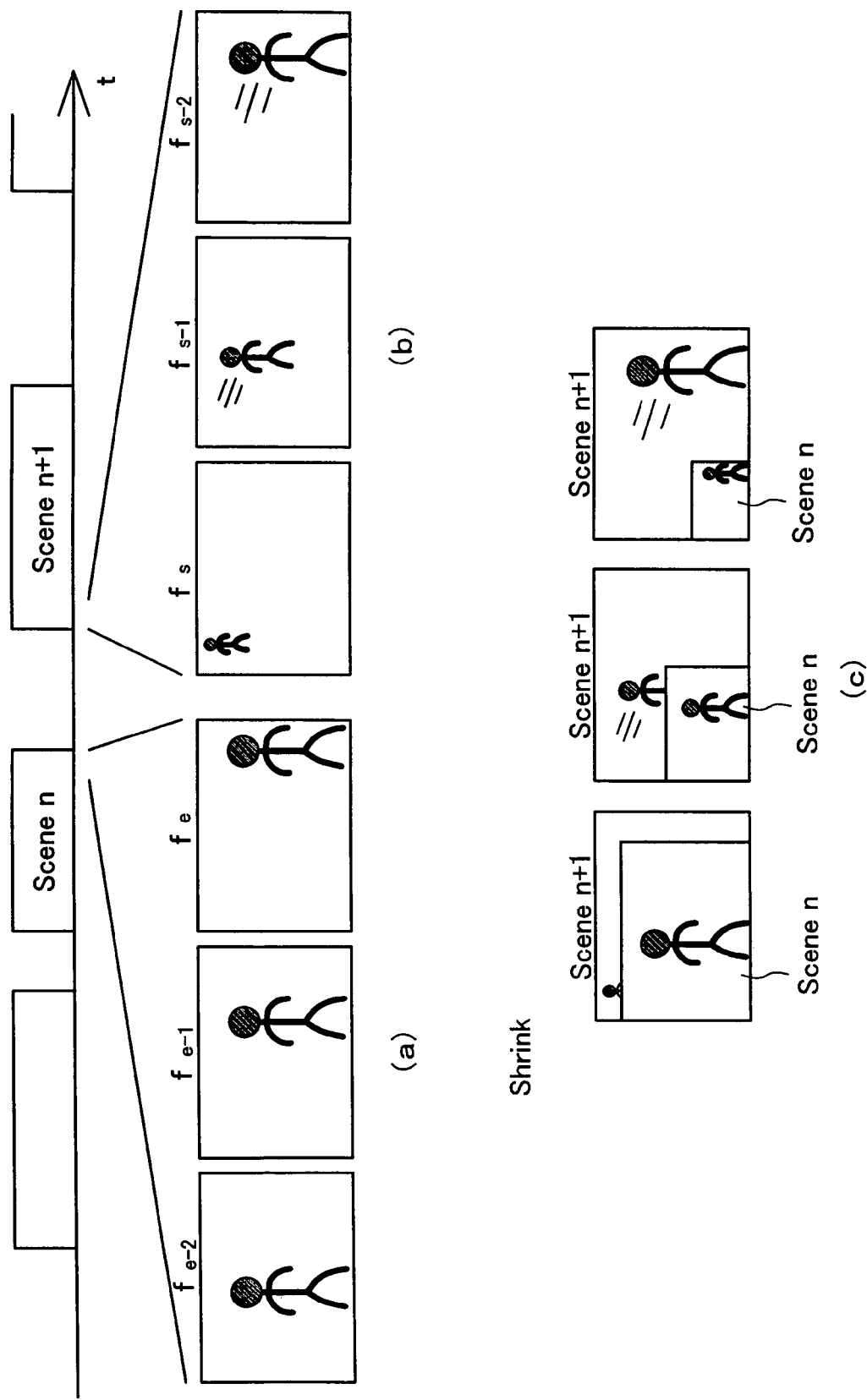
FIG. 12 shows the situation when a transition effect has been performed when the relationship between the two scenes is in Group 3.

FIG. 12 is an embodiment wherein the relationship of the two scenes to be joined together is in Group 3. (a) in FIG. 12 shows the state of the object in scene n, and (b) in FIG. 12 shows the state of the object in scene n+1. Group 3 is the case wherein there are objects in both scene n and in scene n+1 (in this case, people), and the shrink transition effect is used on scene n.

In the present embodiment, the shrink is an image effect wherein the aspect ratio of the frame image remains fixed while the frame image of scene n gradually shrinks at a constant rate with the passage of time. (c) in FIG. 12 shows an embodiment of the use of the shrink transition effect. As is shown in the figure, when changing from scene n to scene n+1 the frame image of scene n gradually shrinks. When it comes to the position where the shrunken scene n is displayed, the direction of movement of the object in scene n+1 is taken into account to detect a position wherein the amount of area of the object in scene n+1 hidden by scene n will be small. This makes it possible to display both scenes at the same time while placing the priority on the object.

As with Group 1 and Group 2, in Group 3 the transitions may be set up focusing on slides and wipes. In such a case, the lengths of scene n and scene n+1, and the characteristic indicators of the scenes, are taken into account. For example, of the characteristic indicators of the scenes, the areas of the objects are compared to setup the transition putting the priority on the scene with the larger display area for the object. In other words, when the display area of the object in scene n is larger than the display area for the object in scene n+1, it may be decided that there is an object in scene n only (in other words, the use of Group 1 may be selected), and processing may be performed in the same way as for Group 1 in order to set up the transition. Of course, the priority with which the scenes are displayed may be set up in advance instead.

Furthermore, the transition may be set up to change the aspect ratios of scene n and scene n+1 to display two screens at the same time. Moreover, the transition may be set up so as to display the object of scene n+1 beginning with a non-object part of scene n (such as the background part).

In contrast to each of the groups described above, wherein each transition is set up focusing on the object as the characteristic indicator of the scene, in Group 4 neither scene has an object. In the present embodiment, a slide-out of scene n is set up for joining together these types of scenes; however, a variety of different transitions may be set up instead. For example, in addition to a wipe or a slide, a fade, a dissolve, a spiral, a zoom, or the like, may be used. Furthermore, these transitions may be selected randomly, or they may be set up in advance according to the preferences of the user.

Given the image processing device according to the first embodiment according to the present invention, as described above, the scene information and indicators of the status of the objects are detected based on frame images extracted for each of the scenes to be joined together. The image effects are selected taking into consideration the contents of the scenes based on the indicators of the statuses of the objects detected in order to connect the two scenes through overlaying the scenes. In other words, if there is an object in the part wherein the scenes are joined together, an image effect that places the priority on displaying the object is selected objectively. Consequently, the video image that has been joined together will have effective scene changes. Furthermore, because the two scenes are overlain as the joining part for a specific period of time, it is possible to reduce the overall length of the resulting video image. This is particularly effective in digest videos, which have the purpose of allowing the viewer to understand the contents of the video image in a short period of time.

B. Second Embodiment

As with the first embodiment, an image processing system according to a second embodiment of the present invention will be explained next. The image processing device according to the second embodiment is an HDD recorder equipped with image processing programs. The HDD recorder in this second embodiment differs from that in the first embodiment only in the image processing programs. Consequently, in terms of the hardware configuration, the same codes as for the image processing system 100 in the first embodiment will be used, and further explanations thereof are omitted. The details of the image processing will be explained.

Figure 13:
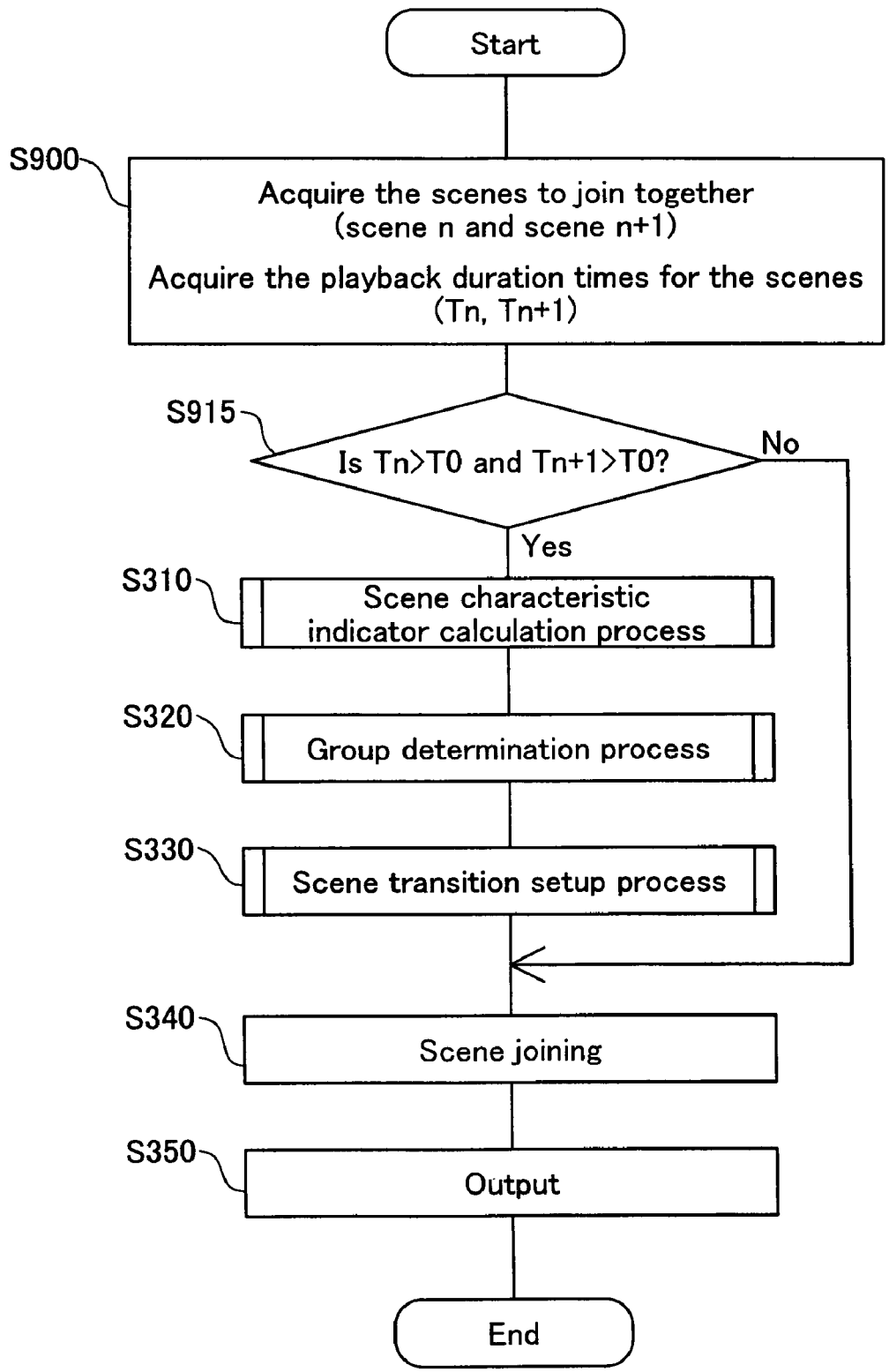
FIG. 13 is a flowchart of the image processing in a second embodiment.

FIG. 13 is a flowchart of the image processing in a second embodiment of joining together specific scenes of a video image. The image processing of this second embodiment adds a step wherein a cut change, wherein the scene changes suddenly, is selected in addition to the image processing of the first embodiment. The other steps are the same as the steps in the image processing in the first embodiment shown in FIG. 3. Note that the steps that are identical in detail are given the same codes as in FIG. 3.

When the image processing is started by the operation of the operating panel 18 by a user, the CPU 15 acquires the two scenes to be joined together (scene n and scene n+1) and also acquires the playback time durations (Tn and Tn+1) of the two scenes. (Step S900)

Following this, the playback time durations (lengths) of the two scenes are checked to see whether or not they are longer than a specific time interval T0. (Step S915). Here a decision is made as to whether to overlap the scenes to join them together or whether to join them together using a cut change.

If, in Step S915, it is determined that the lengths of each of the scenes are longer than the specific time interval T0 (the "yes" case), then the scene characteristic indicator calculation process (Step S310), the group determination process (Step S320), and the scene transition setup process (Step S330) are all performed in the same way as in the first embodiment to setup the transition according to the movement of the object as the characteristic indicator of the scene. The transition that has been set up is used to generate a video image by overlapping both scenes for a specific period of time (Step S340), and is outputted to the hard disk 14 (Step S350). This series of processes is repeated if there are other scenes to be joined together, and if there are no other scenes to be joined together, the process is complete.

On the other hand, if the playback time duration for one or both of the scenes is found to be shorter than the specific time interval T0 (the "NO" case), then no transition that takes into account the characteristic indicators of the scene is set up and the scenes are joined together (Step S340) and outputted to the hard disk 14 (Step S350). In other words, when the length of the scene is short, scene n and scene n+1 are merely joined together, and so a cut change wherein the scene change is abrupt is used.

In the first embodiment, the overall playback time duration was shortened through generating the video image using overlapping, but in the second embodiment, the length of the scene is focused on as the scene information, and for the scenes that are already short to begin with, a cut change is used when generating the video image, and thus there is no particular shortening of the overall length. This does not require any special processing. Moreover, for those scenes that are short to begin with, the use of overlapping would make the scenes even shorter, and so this prevents the scene changes from becoming difficult to watch. The video image that uses cut changes makes it possible to produce video images that can leave strong impressions, such as in action sequences or warning in movies and dramas.

C. Alternative Embodiments

Figure 14:
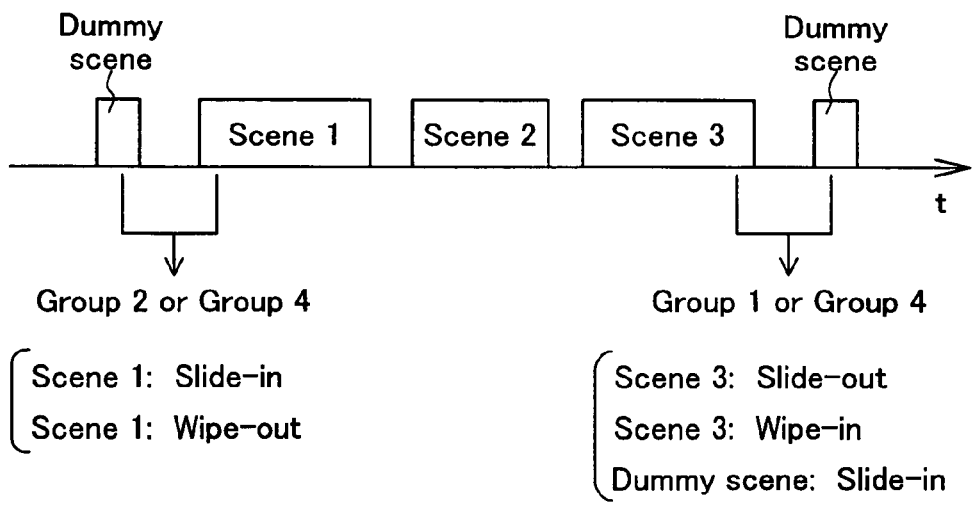
FIG. 14 is an explanatory figure for transitioning for a dummy scene, using a dummy.

The transitions that are set up using the image processing according to the present invention are effective in the places wherein the scene n and the scene n+1 are joined together, and may also be performed at the start and the end of the video images that are produced through the joining. Specifically, as shown in FIG. 14, when joining together scene 1, scene 2, and scene 3, dummy scenes can be placed in a series prior to scene 1 and in a series after scene 3.

Figure 15:
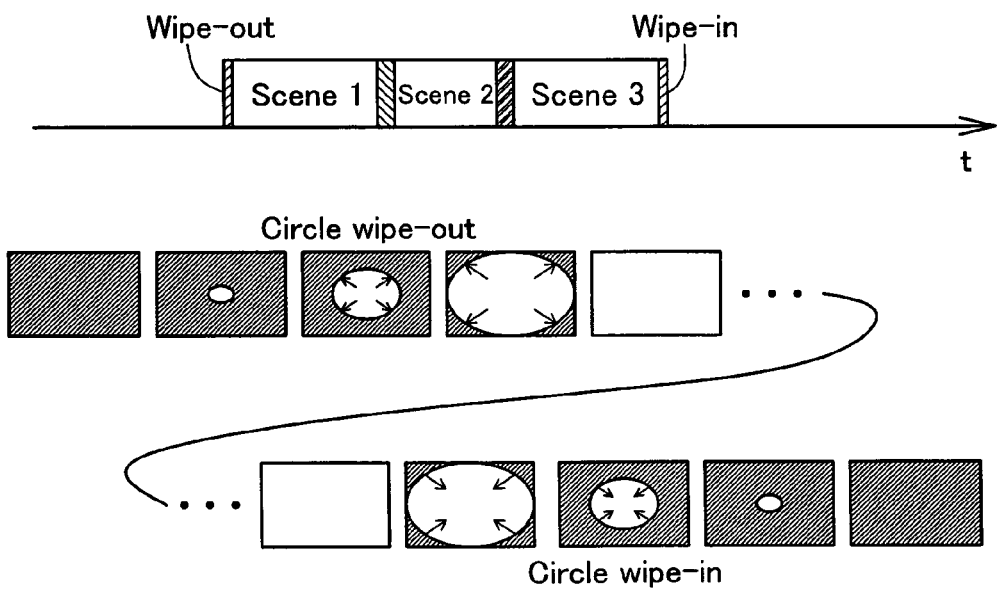
FIG. 15 is an explanatory figure of the situation for transitioning for a dummy scene using a dummy.

The contents of these dummy scenes are set up in advance to have no objects as the characteristic indicators of the scenes. The relationship between the dummy scene and scene 1 will be either in Group 2 or Group 4, as described above, and so the transition effect can be set up so that the video image will start with either a slide-out of the dummy scene or a wipe-out of scene 1. On the other hand, the relationship between scene 3 and the dummy scene will be either Group 1 or Group 4, as described above, making it possible to set up the transition effect to complete the video image through either a slide-in of the dummy scene or a wipe-in or slide-out of the scene 3. In either case, it is possible to set up the scene change taking into consideration the characteristic indicators of the scenes. FIG. 15 shows the situation when handling a case wherein a circle wipe-out is performed prior to scene 1, and a circle wipe-in is performed after scene 3.

Moreover, the title, etc., of the digest video can also be added to the dummy scene. For example, when selecting a video image from the HDD recorder 10 that performs the video processing according to the present invention, information about the video image, such as the title display, the date, etc., can be obtained, and this can be used as an image and added to the dummy scene.

Embodiments according to the present invention were explained above, but the present invention is in nowise limited to these embodiments, but instead can of course be implemented in a variety of embodiments insofar as they do not deviate from the scope or intent of the present invention. For example, the following alternate embodiments are also possible:

Although in the embodiments an HDD recorder 10 was used as the image processing device, a program with this series of image processes can be installed in a personal computer instead. In this case, the video images from, for example, television broadcasts may be put into the personal computer using a video recorder, or may be read directly into the personal computer. Moreover, by equipping a personal computer with functions that use existing methods for producing multiple scenes, such as identifying changes in brightness or changes in color in the video images, it will be possible, for example, to edit video images from, for example, digital video cameras. In particular, in the case wherein the material from which the digest video is produced is a video image captured using a digital video camera, it is possible to use information about the production of the scene (which identifies the scene), such as the date and time of filming.

In the present embodiments, transitions are set up and overlapping is used while taking into account the contents of the scenes when the playback length of the scenes is greater than a specific value; however, the various scenes can merely be joined together without the use of overlapping after setting up transitions at the beginning and ending of each scene. For example, if there is an object at the beginning of a scene, then the transition effect is set up as a wipe-out that is centered on the object, and if there is an object at the end of a scene, then the transition effect is set up as a wipe-in, centered on the object. The video image is generated through linking together each scene that has been added by the addition of a transition in this way. Doing this makes it possible to set up the transitions through considering the contents of the scenes in this way.

Moreover, using the image processing according to the present embodiments makes it possible to display as thumbnails composite frame images generated at the locations of the scene changes for use as an index that shows the details of the video images.

Furthermore, the methods in the present embodiments can be applied not only to image processing, but also to joining together the audio from the scenes that are joined together. For example, when joining together scene n and scene n+1, the audio may be faded out or faded in according to the surface area ratios of the objects in the respective scenes.

Although in the present embodiments scene information was extracted for each of the scenes to be joined together, the scene information need not necessarily be extracted for all of the scenes. For example, if there are two scenes to be joined together, the scene information may always be extracted for only the scene that comes first sequentially, or the scene information may be extracted for only the scene that comes last sequentially. For example, it scene information is extracted from the end of the scene that comes first sequentially and there is an object at the end of the scene, then an image effect such as a wipe can be set up that centers on that object. Moreover, it is not necessary to set up image transitions for all of the joints between scenes. For example, image effects may be set up for, for example, every other joint.

Although forms of embodiment of the present invention have been explained above, the present invention is in nowise limited to these forms of embodiment, but rather the present invention can of course be embodied in a variety of forms insofar as they do not deviate from the intent or scope of the present invention. The scope of rights of the present invention shall be established in harmony with the spirit of the invention as described in the patent claims.

What is claimed is:

1. An image processing device that joins together scenes that are video images, comprising:
    a transition effect storage unit that records in advance a plurality of types of transition effects that are used in changing the scenes when joining together the scenes;
    a scene information extraction unit that extracts scene information which is information that indicates characteristics of the scenes that are to be joined together the scene information extraction unit extracting a state indicator that describes, as scene information, the motion of an object that is judged to be included in a single scene, the object being extracted as an object with movement based on differences between a plurality of frame images that comprise the single scene;
    a transition effects selection unit that selects a specific transition effect from the stored transition effects based on the extracted scene information; and
    a connection unit that joins together the scenes using the selected specific transitioned effects,
    wherein the scene information extraction unit comprises a characteristic indicator calculation unit that detects, as a shift indicator, differences between extracted frame images, that identifies the object by correcting the shift, and that calculates a state indicator indicating the movement of the object.

* * * * *